United States Patent [19]

Hirano

[11] Patent Number: 5,259,020
[45] Date of Patent: Nov. 2, 1993

[54] PORTABLE-TO-PORTABLE CALL TRANSFER SYSTEM FOR CORDLESS TELEPHONE

[75] Inventor: Masahiro Hirano, Saitama, Japan

[73] Assignees: Pioneer Electronic Corporation, Tokyo; Pioneer Communications Corporation, Saitama, both of Japan

[21] Appl. No.: 875,415

[22] Filed: Apr. 29, 1992

[30] Foreign Application Priority Data

Jun. 6, 1991 [JP] Japan .................................. 3-134799

[51] Int. Cl.⁵ ........................ H04M 11/00; H04B 1/00
[52] U.S. Cl. ....................................... 379/61; 455/54.1
[58] Field of Search ........................ 379/56, 58, 59, 60, 379/61, 63, 201, 210, 211, 212; 455/31.1, 33.1, 33.2, 39, 49.1, 53.1, 54.1, 73, 78

[56] References Cited

U.S. PATENT DOCUMENTS

| | | | |
|---|---|---|---|
| 3,644,681 | 2/1972 | Rice | 379/61 |
| 4,112,257 | 9/1978 | Frost | 379/58 |
| 4,939,785 | 7/1990 | Murata et al. | 455/54.1 |

FOREIGN PATENT DOCUMENTS

| | | | |
|---|---|---|---|
| 0024526 | 1/1989 | Japan | 455/33.1 |
| 0101427 | 4/1991 | Japan | 455/33.1 |
| 0131132 | 6/1991 | Japan | 455/33.1 |

*Primary Examiner*—Jin F. Ng
*Assistant Examiner*—William D. Cumming

*Attorney, Agent, or Firm*—Sughrue, Mion, Zinn, Macpeak & Seas

[57] ABSTRACT

A portable-to-portable call transfer system for cordless telephone. The base unit is connected with a portable unit over a radio channel. The call-transfer requesting signal relay responds to a transfer requesting signal from a calling portable unit to hold an incoming call while also transmitting both the transfer requesting signal and the channel number of a talk channel to a called portable unit over a control channel. The portable-to-portable line setting section transmits the off-hook signal to the calling portable unit over the talk channel and connects the receiver output of a transmitter-receiver to the transmitter input of the transmitter-receiver so as to enable the calling portable unit to send a voice message to the called portable unit upon reception of an off-hook signal from the called portable unit. The portable-to-portable line disabling section disables the connection of the receiver-output-to-transmitter-input and connects the incoming call to the called portable unit upon reception of an on-hook signal from the calling portable unit. The call-transfer requesting signal generator outputs a call-transfer requesting signal to the base unit. The call-transfer requesting signal indicates a portable unit to which the incoming call is transferred. The call-transfer line setting section permits to send the voice message upon reception of the off-hook signal via the base unit. The call-transfer line disabling section establishes a talk channel between the base unit upon reception of the on-hook signal via the base unit.

1 Claim, 3 Drawing Sheets

PORTABLE-TO-PORTABLE CALL TRANSFER SYSTEM FOR CORDLESS TELEPHONE

BACKGROUND OF THE INVENTION

1. Field of the Invention

The present invention relates to a portable-to-portable call-transfer system for cordless telephone where an incoming call connected to a portable unit via a base unit is transferred to another portable unit.

2. Prior Art

With a conventional portable-to-portable call transfer system for cordless telephone, when a calling portable unit transmits a call-transfer requesting signal to the base unit, the base unit temporarily holds the incoming call while also causing the bell of a called portable unit to ring. As soon as the operator of the called portable unit picks up the handset, the base unit connects the incoming call to the called portable unit. Thus, when a call is transferred from one portable unit to another, a voice message such as "Mr. Bush, you are wanted on the phone" cannot be sent from the calling portable unit to the called portable unit.

SUMMARY OF THE INVENTION

An object of the invention is to provide a portable-to-portable call transfer system where a voice message can be sent from a calling portable unit to a called portable unit when an incoming call is transferred from one portable unit to another.

Another object of the invention is to provide a portable-to-portable call transfer system where a single talk channel is used when transferring an incoming call from one portable unit to another together with a voice message.

A portable-to-portable call transfer system for cordless telephone has a base unit and a plurality of portable units. The base unit is connected with a portable unit over a radio channel. The base unit includes a call-transfer requesting signal relay (10), a portable-to-portable line setting section (11), and a portable-to-portable line disabling section (12). The call-transfer requesting signal relay (10) responds to a transfer requesting signal from a calling portable unit to hold an incoming call while also transmitting both the transfer requesting signal and the channel number of a talk channel to a called portable unit over a control channel. The portable-to-portable line setting section (11) establishes a portable-to-portable line by connecting the receiver output of a transmitter-receiver to the transmitter input of the transmitter-receiver so as to enable the calling portable unit to send a voice message to the called portable unit upon reception of an off-hook signal from the called portable unit. The section (11) transmits the off-hook signal to the calling portable unit over the talk channel. The portable-to-portable line disabling section (12) disables the connection of the receiver-output-to-transmitter-input and connects the incoming call to the called portable unit upon reception of an on-hook signal from the calling portable unit.

Each of the plurality of portable units includes a call-transfer requesting signal generator (20), a call-transfer line setting section (21), and a call-transfer line disabling section (22).

The call-transfer requesting signal generator (20) outputs a call-transfer requesting signal to the base unit. The call-transfer requesting signal indicates a portable unit to which the incoming call is transferred. A call-transfer line setting section (21) permits to send the voice message upon reception of the off-hook signal via the base unit. The call-transfer line disabling section (22) establishes a talk channel between the base unit upon reception of the on-hook signal via the base unit.

BRIEF DESCRIPTION OF THE DRAWINGS

Features and other objects of the invention will be more apparent from the detailed description of the preferred embodiments with reference to the accompanying drawings in which.

DESCRIPTION OF THE PREFERRED EMBODIMENTS

Embodiment

Figure 1A:
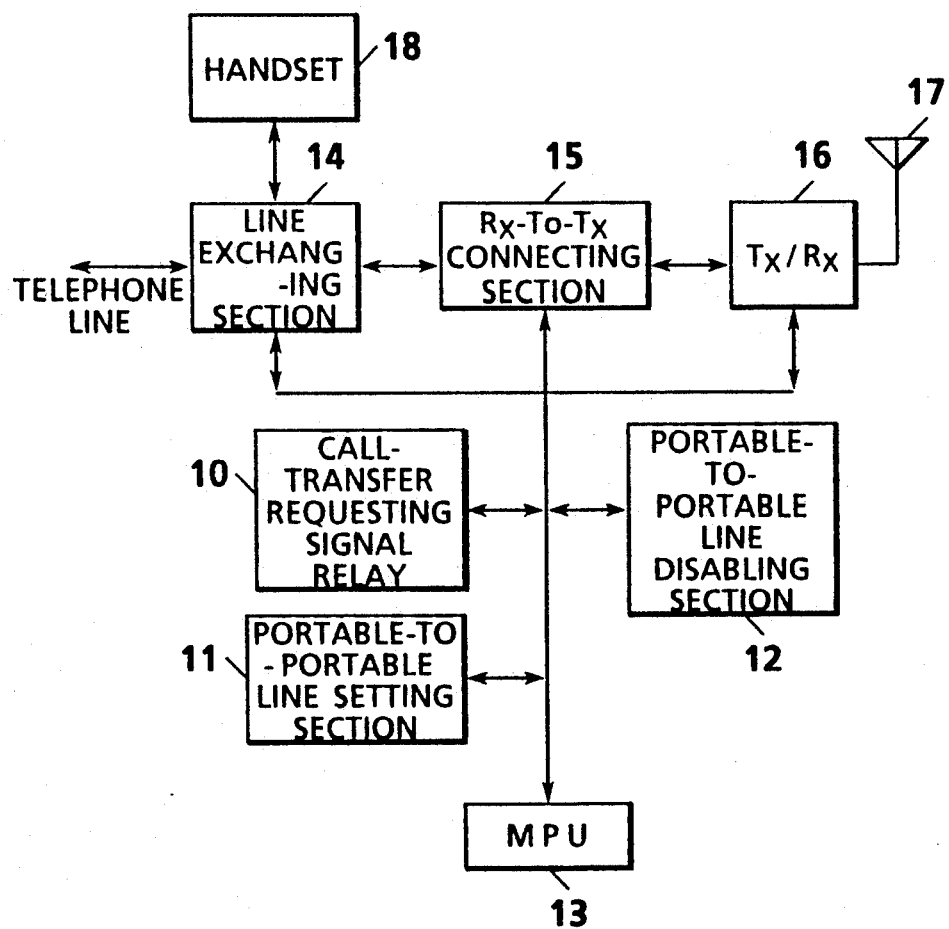
FIG. 1A shows an embodiment of a base unit used in a portable-to-portable call transfer system for cordless telephone according to the invention.

An embodiment of the invention will now be described in detail with reference to FIGS. 1A and 1B. FIG. 1B shows an embodiment of a portable unit of a portable-to-portable call transfer system for cordless telephone according to the invention. In the figure, a transmitter-receiver 26 receives a radio wave through an antenna 30 from the base unit as well as transmits various signals to the base unit. A Tx controller 27 controls the transmitter-receiver 26 to transmit a radio wave as well as to stop the transmission of the radio wave. A keyboard 23 has ten keys corresponding 0 to 9 for generating dial pulses and function keys such as "*" and "#." A handset 24 has a microphone and an earphone therein. A line exchanging section 25 connects the microphone of handset 24 to the transmitter input of transmitter-receiver 26 during the talking mode, and connects the receiver output to the earphone of handset 24 during the listening mode. A signal connecting section 28 disconnects the receiver output of the transmitter-receiver 26 from the earphone of handset 24 during the talking mode. The line exchanging section 25 also relays various control signals between the transmitter-receiver 26 and a microprocessor (MPU) 29. A call-transfer requesting signal generator 20 takes the form of, for example, a program, and generates a signal for requesting the base unit of a call transfer to another portable unit.

A call-transfer line setting section 21 takes the form of, for example, a program which provides a procedure for informing another portable unit of a call transfer from a calling portable unit to that portable unit.

When the called portable unit receives the call transfer requesting signal, the signal causes the bell of the called portable unit to ring. Then, the call-transfer line setting section 21 of the calling portable unit causes the bell of the calling portable unit to stop ringing while also outputting a command to a Tx controller 27 to transmit a radio wave and another command to a signal connecting section 28 to disconnect the receiver output from the earphone of handset 24.

The call-transfer line setting section 21 of the called portable unit outputs a command to a Tx controller 27 to stop transmission of a radio wave.

A call-transfer line disabling section 22 takes the form of, for example, a program and generates a signal for disabling a line through which a incoming call is transferred from one portable unit to another. When the called portable unit begins to transmit a radio wave upon receiving an on-hook signal from the calling portable unit, it is said that call-transfer line is disabled.

Figure 1B:
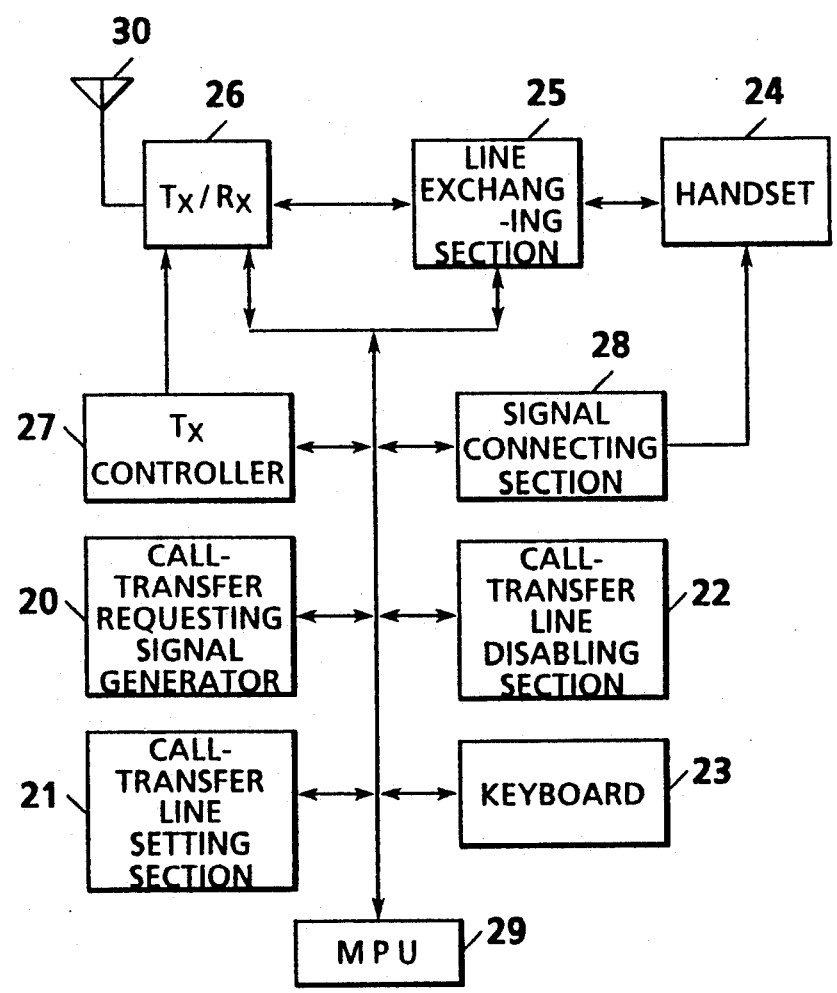
FIG. 1B shows an embodiment of a portable unit of the invention.

FIG. 1A shows an embodiment of a base unit according to the present invention. A transmitter-receiver 16 provides radio channels between the base unit and the portable unit. The radio channels include a control channel and a talk channel. The transmitter output of transmitter-receiver 16 is radiated through an antenna 17. A line exchanging section 14 connects an incoming call from telephone line to the handset 18 during normal call, and connects an incoming call to a Rx-to-Tx connecting section 15.

A call-transfer requesting signal relay 10 takes the form of, for example, a program. When the base unit receives a transfer requesting signal from the calling portable unit, a microprocessor 13 causes, under control of the relay 10, to hold the incoming call and causes the transmitter-receiver 16 to be set for a control channel. Then, the microprocessor 13 transmits through the control channel the call-transfer requesting signal and the channel number of a talk channel. This talk channel is a radio channel for enabling the communication between the called portable unit and the base unit, and is the same the radio channel between the base unit and the calling portable unit. It should be noted that only one talk channel is required in the present invention.

A portable-to-portable line setting section 11 takes the form of, for example, a program. Under control of this program, the microprocessor 13 directs a response signal or off-hook signal from the called portable unit to the transmitter input of transmitter-receiver 16 so that the response signal is further transmitted from the transmitter-receiver 16 of the base unit.

The Rx-to-Tx connecting section 15 connects the receiver output of the transmitter-receiver 16 to the transmitter input so that a voice message can be sent from the calling portable unit to the called portable unit. A portable-to-portable line disabling section 12 takes the form of, for example, a program and disables the connection between the receiver output of the transmitter-receiver 16 and the transmitter input as well as disables the holding of speaking circuit.

Operation of the System

Figure 2:
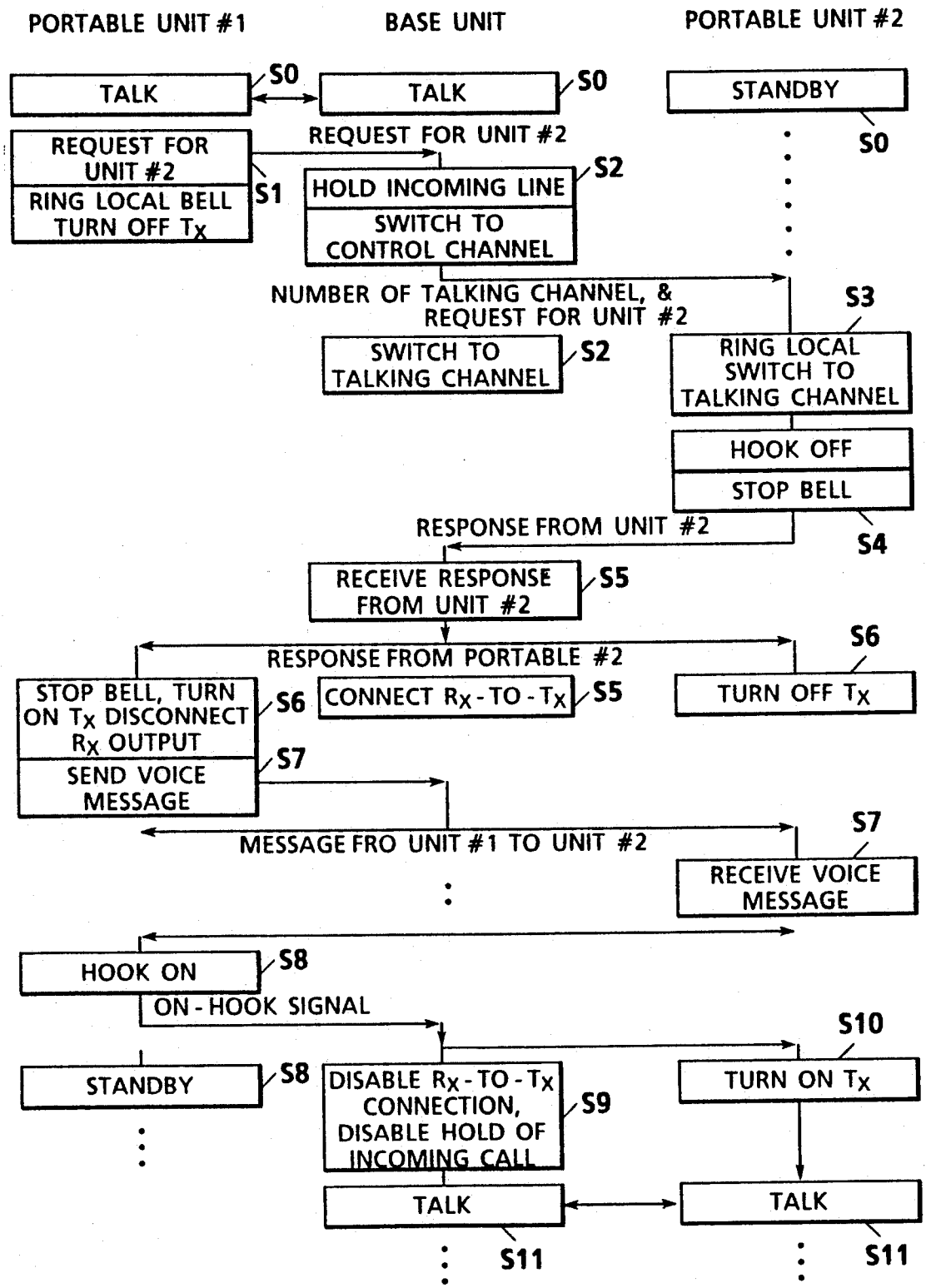
FIG. 2 is a flowchart illustrating the operation of the base unit and the portable units according to the invention.

The operation of the invention will now be described in detail with reference to a flowchart in FIG. 2. In this embodiment, it is assumed that a portable unit 1 is connected with an external telephone line and the operator of the unit 1 wishes to transfer the call to a portable unit 2.

STEP 0: The transmitter-receivers of both the base unit and portable unit 1 have been set for a talk channel through which the portable unit 1 is connected with the external line. The transmitter-receiver 26 of portable unit 2 has been in standby condition on the control channel.

STEP 1: The operator of portable unit 1 wishes to transfer the incoming call to the portable unit 2, and the operator operates the keyboard 23 so as to input a command requesting of the transfer of the incoming call from portable unit 1 to portable unit 2. Upon the command, the call-transfer requesting signal generator 20 transmits a call-transfer requesting signal to the base unit and then causes the local bell to ring, informing the operator of portable unit 1 that the portable unit 2 is being called.

STEP 2: When the base unit receives the call transfer requesting signal from the portable unit 1, the call-transfer requesting signal relay 10 temporarily holds the incoming call connected to the portable unit 1 and switches the transmitter-receiver 16 from the talk channel to the control channel so as to transmit the call-transfer requesting signal and the channel number of the talk channel currently linking between the portable unit 1 and base unit. Thereafter, the call-transfer requesting signal relay 10 switches the transmitter-receiver 16 from the control channel back to the talk channel.

STEP 3: When the portable unit 2 receives from the base unit the call-transfer requesting signal and the channel number of talk channel, the microprocessor 29 causes the local bell to ring to inform the operator of the portable unit 2 that the portable unit 2 is being called, and switches the transmitter-receiver 26 from the control channel to the talk channel specified by the channel number.

STEP 4: When the operator of portable unit 2 picks up the handset 24, the bell stops ringing and a response signal or off-hook signal is transmitted from the portable unit 2 to the base unit over the talk channel.

STEP 5: When the base unit receives the response signal from the portable unit 2, the portable-to-portable line setting section 11 directs the response signal to the transmitter-receiver 16 which in turn transmits the response signal through the antenna 17. It should be noted that the response signal transmitted by the base unit is received by both the portable unit 1 and the portable unit 2. After transmission of the response signal, the microprocessor 13 outputs a command to the Rx-to-Tx connecting section 15 to connect the receiver output to the transmitter input.

STEP 6: Upon reception of the response signal transmitted from the base unit, the call-transfer line setting section 21 of the portable unit 2 outputs a command to the Tx controller 27 to stop transmission of radio wave. The call-transfer line setting section 21 of portable unit 1 causes the local bell to stop ringing as well as outputs a command to the Tx controller 27 to transmit a radio wave and a command to the signal connecting section 28 to disconnect the receiver output from the handset 24.

STEP 7: The operator of portable unit 1 knows of the response of unit 2 from the fact that the bell of unit 1 stops ringing, and begins to speak a message such as "Mr. Bush, a phone call for you." to the microphone of handset 24. The message is received by the base unit and is transmitted further from the base unit. The radio wave from the base unit is received by both the unit 1 and unit 2. The receiver output of unit 1 has been disconnected from the earphone of handset 24, and therefore there will be no talker's echo so that the voice message is properly sent to the portable unit 2.

STEP 8: Upon completion of a voice message from the unit 1, the operator of unit 1 hang up the handset. Then, the unit 1 outputs an on-hook signal and then enters a standby condition.

STEP 9: When the base unit receives the on-hook signal from the unit 1, the portable-to-portable line disabling section 12 outputs a command to the Rx-to-Tx connecting section 15 to disable the connection between the receiver output of the transmitter-receiver 16 and the transmitter input while also connecting the incoming call, which has been temporarily held, to the transmitter-receiver 16.

STEP 10: When the unit 2 receives the on-hook signal via the base unit from the unit 1, the call-transfer line disabling section 22 outputs a command to the Tx controller 27 to control the transmitter-receiver to transmit a radio wave.

STEP 11: The operator can now answer to the incoming call.

What is claimed is:

1. A portable-to-portable call transfer system for cordless telephone having a base unit and a plurality of portable units where the base unit is connected with a portable unit over a radio channel, said base unit comprising:
   a call-transfer requesting signal relay responsive to a transfer requesting signal from a calling portable unit, said relay holding an incoming call while also transmitting both said transfer requesting signal and a channel number of a talk channel to a called portable unit over a control channel;
   a portable-to-portable line setting section for establishing a portable-to-portable line by connecting a receiver output of a transmitter-receiver to a transmitter input of the transmitter-receiver so as to enable said calling portable unit to send a voice message to said called portable unit upon reception of an off-hook signal from said called portable unit, said portable-to-portable line setting section transmitting said off-hook signal to said calling portable unit over said talk channel; and
   a portable-to-portable line disabling section for disabling said connection of the receiver-output-to-transmitter-input and for connecting the incoming call to said called portable unit upon reception of an on-hook signal from said calling portable unit;

said each of said plurality of portable units comprising:
   a call-transfer requesting signal generator for outputting a call-transfer requesting signal to said base unit, said call-transfer requesting signal indicating a portable unit to which said incoming call is transferred;
   a call-transfer line setting section for permitting to send said voice message upon reception of said off-hook signal via said base unit; and
   a call-transfer line disabling section for establishing a talk channel between said base unit upon reception of said on-hook signal via said base unit.

* * * * *